Figure 1:
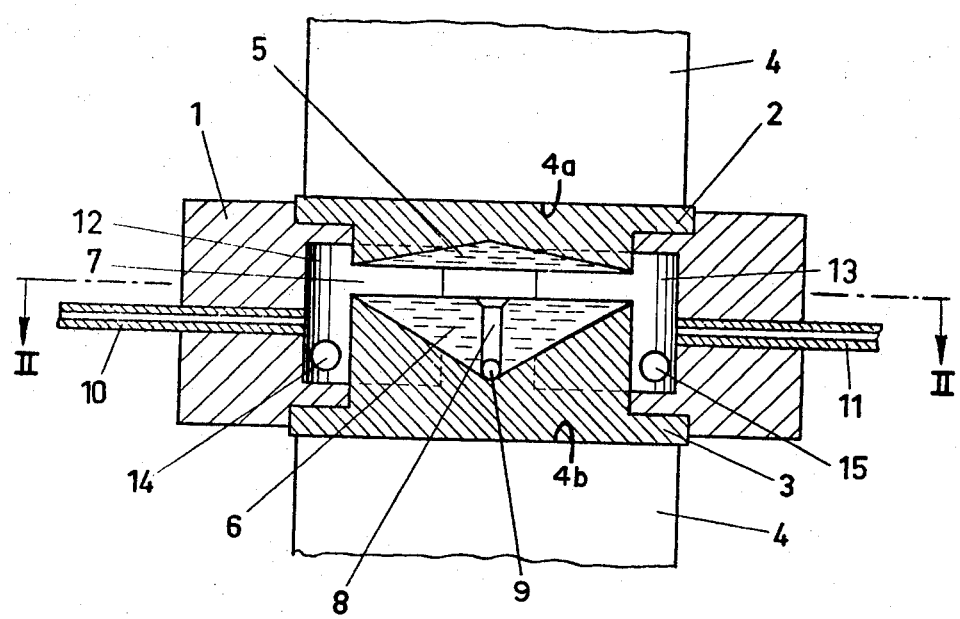

United States Patent [19]  
Machytka

[11] 3,866,461  
[45] Feb. 18, 1975

[54] PARA-MAGNETIC GAS ANALYZER
[75] Inventor: Herbert Machytka, Niederhochstadt, Germany
[73] Assignee: Hartmann & Braun Aktiengesellschaft, Frankfurt/Main, Germany
[22] Filed: Apr. 12, 1971
[21] Appl. No.: 133,110

[30] Foreign Application Priority Data
Apr. 11, 1970 Germany............................ 2017423

[52] U.S. Cl....................... 73/23, 73/27 A, 324/36
[51] Int. Cl........................... G01n 7/00, G01n 27/00
[58] Field of Search ................ 73/23, 27 A; 324/36

[56] References Cited
UNITED STATES PATENTS
2,696,731   12/1954   Luft ......................................... 73/23
2,903,883   9/1959    Luft ...................................... 73/27 A
3,287,959   11/1966   Luft ...................................... 73/27 A
3,584,499   6/1971    Hummel ................................... 73/23

FOREIGN PATENTS OR APPLICATIONS
1,149,187   5/1963    Germany ............................. 73/27 A Primary Examiner—Richard C. Queisser
Assistant Examiner—Stephen A. Kreitman
Attorney, Agent, or Firm—Ralf H. Siegemund

[57] ABSTRACT

A paramagnetic gas analyzer has a housing with two soft iron inserts inserted from opposite sides and having flat outer surfaces and flared inner surfaces filled with non-magnetic material to define a duct. Two crescent-shaped, lateral chambers in the housing communicate with each other through the duct and are separately connected to a test gas source and a reference gas source. One of the inserts has a central bore to discharge the gases from the duct as entering the duct from the oppositely located chambers. The entire assembly is energized by inserting the housing into the gap defined by plane parallel end faces of an energizing magnet, so that these end faces make surface to surface contact respectively with the two outer surfaces of the inserts as inserted in the housing.

6 Claims, 2 Drawing Figures

PATENTED FEB 18 1975  3,866,461

PARA-MAGNETIC GAS ANALYZER

For measuring the paramagnetic gas content in gas mixtures it has been common to employ the measurement of effects of the force of action of an inhomogenous or non-uniform magnetic field on the paramagnetic gas molecules in the mixture. This conception is embodied in the showing in FIG. 1 of U.S. Pat. No. 3,287,959 wherein two gas chambers with a common gas outlet are situated on beveled pole pieces of a permanent magnet. A pump in the gas outlet line draws measuring gas through one chamber and comparison gas of constant susceptibility through the other chamber. Due to the action of the inhomogenous peripheral field of the magnet on the paramagnetic content of the gas, a pressure difference arises between the two chambers which results in a flow of gas in a duct connecting the two chambers. The gas flow in the connecting duct is measured by means of a temperature-dependent bridge circuit by well-known heat conductivity methods. If the two gases contain a paramagnetic component, say, oxygen, then the electrical output from the bridge is a measure of the difference in oxygen content for the two gases and hence a measure of the oxygen content in the measuring gas.

Membrane electrical condensers are also used to measure pressure differences and they are quite satisfactory if the magnet for the gas analyzer is energized with alternating current. The electrical output signal from the pressure difference measurer is then an alternating voltage whose amplitude corresponds to the oxygen concentration.

The measuring effect produced by such mentioned gas analyzers is very weak so that every means to enhance the pressure difference is necessary. The invention concerns this objective and enables an increase in the measuring effect by a novel shape of the magnetic gap, between opposite poles of the magnet where the measuring chamber is located and through which measuring and comparison gases simultaneously pass by drawing off of gas through a common exit. With the use of an alternately excited magnet a relatively high sensitivity is assured.

The invention, briefly described, includes in an analyzer of the type described, a chamber formed between two pole pieces of soft iron inserted respectively in oppositely situated face planes of a plate of non-magnetic material, the chamber housing so formed by the pole pieces in the plate being slidably inserted in between parallel end faces of adjacent magnet poles so that the space between pole pieces provides a small magnetic gap. The inner side walling of the chamber is provided with bayed recesses opposite each other outer from the gap zone and each in communication with measuring and comparison gas ducts, while one of the pole pieces has a central bore turned at right angles within the piece to lead, with an alined bore through the chamber housing to the exterior for connection to gas take-off.

It is especially advantageous to have the pole pieces round and tightly passing through the chamber housing and have the bays somewhat sickle-shaped.

An especially increased measuring effect with negligible noise or interference is obtained if the pole pieces are provided with recesses which widen toward the gap and are filled with, or sealed off by, non-magnetic material to minimize turbulances of the gas flow.

DRAWING

Figure 2:
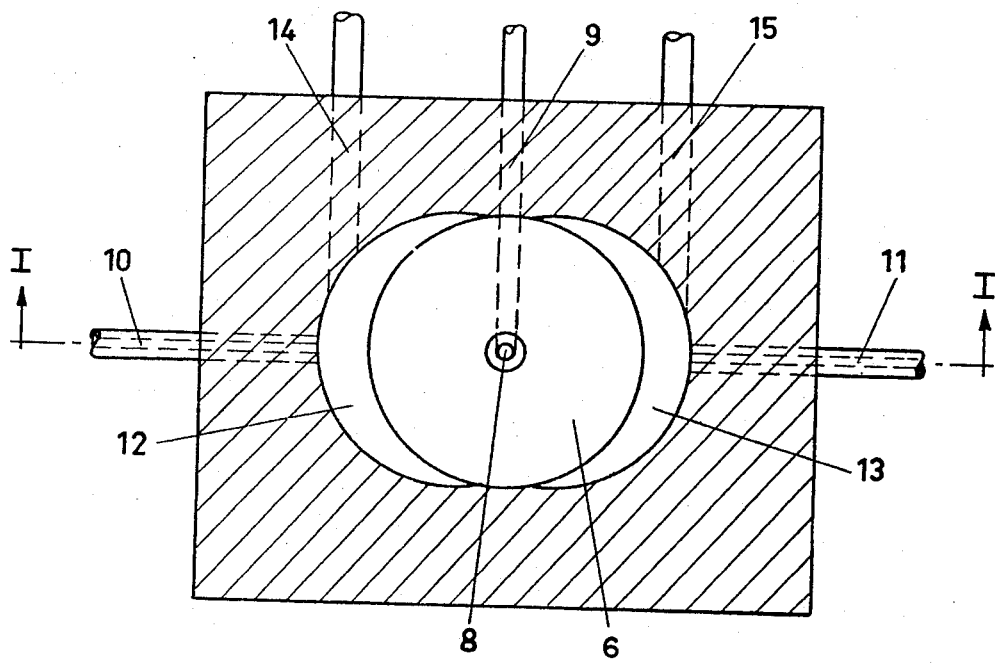

FIG. 1 is vertical cross-section through a measuring chamber of a gas analyzer, and FIG. 2 is horizontal section of the same chamber, the section being taken along the line II–III of FIG. 1, and indicating the section plane for the view of FIG. 1, line I—I in FIG. 2.

A plate 1 of non-magnetic material such as brass constitutes a housing body, which is provided with a cylindrical hole therethrough having counter bores forming ledging at each face of the plate. Two pole pieces 2 and 3 of soft steel or iron are pressed tightly in the counter bores to close off the outer ends of the hole. Preferably clamping means are used in order that the closure be gas-tight. The pole pieces each have flat, outwardly directed surface portions which lie form-closed at the parallel pole end-faces 4a and 4b of an alternately or periodically excited magnet 4. As can be seen from the drawing, the distance between pole end faces 4a and 4b is the same as the spacing between the flat outer end faces of the two pole pieces, when inserted in body 1, so that the body with inserted pole pieces can be slid into the space between pole faces 4a and 4b and enter into tight filling engagement therewith.

An electromagnet is preferably used so that the excitation may be obtained by the use of constant amplitude pulsating direct current. The pole pieces 2 and 3 which are situated opposite each other and very close together but with a gap between are provided with flaring conical recesses 5 and 6, filled with non-magnetic material so as to provide an effective horizontal gap 7 with parallel faces as far as gas flow between the gap boundaries are concerned, but magnetically the gap is quite non-uniform due to the conical contour of both magnets.

The lower pole piece 3 is thicker than the corresponding upper piece 2 so that the conical recess 6 is deeper than recess 5. This deep recess 6 enables the easy provision of a central conduit bore 8 of significant length and running in the direction of the lines of force of the magnet. At the bottom of the recess 6 the conduit bore 8 joins at right angles with a conduit passageway 9 radially through the pole piece 3 and through the plate 1, as shown in FIG. 2, to the exterior.

Analysis or measuring gas enters the chamber through conduit 10 while a comparison gas enters through conduit 11, each into crescent shaped throats 12 and 13 respectively in the side walling of the cylindrical measuring chamber, the throats lying opposite one another. The gases flow toward the middle of the gap 7 in order that they then leave via the central conduit bore 8 in the filled-in pole piece 3 and bore 9 to the exterior. Conduit means 14 and 15 to the two respective throats 12 and 13 are provided for the connecting of a pressure-difference indicating instrument (not shown).

The invention exhibits an outstandingly large measuring effect in comparison with other similar instruments due to the features of the measuring chamber. Here there is a pole-piece arrangement in the measuring chamber where a pole piece has a central gas outlet, the effective gas gap between the pole pieces is quite small and the field strength high and the zone of non-uniformity extends outwardly and inwardly by alteration of the pole pieces, so that there is a large graduation in field strength which in turn determines the amount of measuring effect. Since the pole pieces are form-closed on the pole end faces of the periodically excited magnet, there is substantially nothing to cause back ground noise except magneto-striction. The crescent shaped throats enable the exploitation of practically the whole non-uniform peripheral zone for action on the gas molecules. The gas feed connections can be made very short without lowering the measuring effect. Which further means that the pressure drop owing to presssure equalization with the exterior is held to a minimum. Lastly, leading the gasses, well confined, almost to the very gap gives an extensive laminar flow so that very little disturbance remains.

The invention claimed is:

1. In a paramagnetic gas analyzer, wherein an analysis gas and a comparison gas are passed through a magnetic field from different directions and wherein a difference in the paramagnetic characteristics of the gases results in a pressure differential which can be measured, the improvement comprising:

a magnet having two flat and plane-parallel pole faces facing each other at a particular distance;

a housing body made of non-magnetic material and having a bore traversing the body from one of its sides to the respective opposite side;

a first and a second soft magnetic pole piece inserted in the bore respectively from the one side and from the opposite side of the housing body, but leaving a gap between them, the pole pieces each having a flat surface portion, the distance between the flat surface portions as inserted being the same as the particular distance between the pole faces of the magnet, so that the body with inserted pole pieces can be introduced between the pole faces respectively in form-closed, surface to surface engagement respectively of the pole faces with the flat surfaces of the pole pieces so as to magnetize these first and second pole pieces only through said engagement with the magnet;

the bore in the body having lateral recesses defining a pair of chambers which are oppositely located to each other, the recesses each being covered in parts by both of said inserted pole pieces, but being flow conductively interconnected by the gap between the pole pieces, the two gases are respectively introduced into said chambers and flowing into the gap from opposite sides; and one of the pole pieces having a central discharge conduit bore opening into the gap and turned at right angles in said one pole piece, the housing body having an outwardly open bore in communication with said conduit bore.

2. In an analyzer as in claim 1, wherein the magnetic material of the pole pieces has end faces as respectively facing each other, the end faces having contour for establishing a magnetic field gap of variable distance as between the pole pieces to obtain an inhomogenic field, there being non-magnetic material on the end faces to establish the narrower gap for gas flow but of constant width.

3. In an analyzer as claimed in claim 1, wherein the gas flow gap as defined between the pole pieces has parallel upper and lower surfaces.

4. In an analyzer as claimed in claim 1, wherein pole pieces are made of iron and have flaring recesses facing each other to establish an inhomogenous magnetic field across the gas flow gap.

5. In an analyzer as claimed in claim 4, and having non-magnetic material substantially filling the recesses for defining the gas flow gap with parallel upper and lower boundaries.

6. In an analyzer as in claim 1, wherein the bore in the housing body adjacent said one side and said opposite side is round, the pole pieces respectively fitting therein in tight fit, the recesses together with the inserted pole pieces having crescent-shaped configuration in cross-section in a plane that runs transverse to said distance as between said pole faces.

* * * * *